United States Patent [19]

Kelm et al.

[11] Patent Number: 4,884,483
[45] Date of Patent: Dec. 5, 1989

[54] DEVICE FOR LOCKING A TOOL HOLDER TO A TOOL BLOCK

[75] Inventors: Walter H. Kelm, Mt. Clemens; Paul W. Newland, Warren, both of Mich.

[73] Assignee: Carboloy Inc., Warren, Mich.

[21] Appl. No.: 169,286

[22] Filed: Mar. 17, 1988

[51] Int. Cl.$^4$ .............................................. B23B 29/00
[52] U.S. Cl. ........................................ 82/160; 82/158
[58] Field of Search ................... 82/36 A, 36 B, 36 R, 82/37, 158, 159, 160, 161; 407/102, 109

[56] References Cited

U.S. PATENT DOCUMENTS

| | | | |
|---|---|---|---|
| 3,377,685 | 4/1968 | Carlstedt | 82/37 |
| 3,425,305 | 2/1969 | Cocco | 82/37 |
| 4,680,999 | 7/1987 | Kojima | 82/36 B |
| 4,725,173 | 2/1988 | Hoffman | 82/36 B |

Primary Examiner—James G. Smith
Assistant Examiner—Blynn Shideler
Attorney, Agent, or Firm—Hedman, Gibson, Costigan & Hoare

[57] ABSTRACT

A tool assembly which comprises a tool holder and tool block having respective alignable opposed slots and further includes a registration key secured in one pair of aligned slots and a thrust key secured in the other pair of aligned slots, the thrust key having an upper wall section adapted to engage the wall of the other tool holder slot to thereby cause the tool holder to rotate until the wall of the opposite slot is pressed against a corresponding wall of the registration key.

12 Claims, 3 Drawing Sheets

DEVICE FOR LOCKING A TOOL HOLDER TO A TOOL BLOCK

FIELD OF THE INVENTION

The present invention is directed to a dual purpose device for securing a tool holder to a tool block and insuring that the cutting insert is at the precise center height of the tool assembly when the components of the tool assembly are locked together.

BACKGROUND OF THE INVENTION

A tool holder having a cutting insert assembly at one end thereof generally is provided with a tapered shank which is insertable into a tool block. The tool block is secured to a machine tool which rotates the tool block against a static workpiece or the workpiece is moved while the tool block is maintained in a static position (i.e. non-rotational).

Significant radial and tangential forces act on the cutting insert during machining operations. If the cutting insert is misaligned with respect to the cutting tool and/or if the tool holder is not precisely locked in place in the tool block, tool failure and imprecise cuts result.

In order to provide precise machining of the workpiece, especially for static tool blocks it is essential that the tool holder and tool block are locked together in alignment within narrow tolerances. The locking mechanism typically comprises providing the outer surfaces of the tool holder and tool block with opposed slots or keyways and providing the tool block with projections or keys of complimentary shape which are securable in the slots of the tool holder when the tool holder is operatively secured within the tool block. The key/keyway assembly is used in static tools to both locate the tool holder with respect to the tool block and also to dissipate the extreme torque applied to static tools from a rapidly moving (e.g. rotating) workpiece.

The keys or projections are secured to the base of the tool block slots and extend outward from the tool block slots and into the corresponding slots of the tool holder. The tool holder and tool block are thereby prevented from rotational movement with respect to each other by the contact of the walls of the keys against the walls of the respective tool holder and tool block slots.

The slots of the tool holder and the tool block are located such that the centerline of the locked tool components passes through the center of the aligned pairs of slots. The object is to ensure that the plane passing through the cutting edge of the cutting insert at the end of the tool holder is aligned in a plane corresponding to the centerline of the tool assembly.

This system, however, does not achieve the desired degree of alignment especially for making fine cuts in a workpiece. Industry standards require that the width of a typical tool holder slot of, for example, 0.645 inches, be machined at tolerances of ±0.010 inches. Thus, the slot can have a width in the range of 0.635 to 0.655 inches. Since the centerline of the locked tool components is defined by the plane passing through the center of the slot, the centerline may vary for each tool assembly produced because of variations in the width of the slots. This can result in misalignment of the cutting insert and inaccurate cuts in the workpiece.

Furthermore, because the cutting insert is further from the centerline than the tool holder slot, a small displacement in the width of the slot provides an even larger displacement of the cutting insert.

A further disadvantage of center slot alignment is that the keys secured within the slots may not rest flush against the walls of the slot due to the same variations in the width of the slot. Thus, the keys may move within the slot when subjected to the torque applied by the rotating workpieces during machining operations.

It is therefore an object of the present invention to provide a tool assembly which allows precisely controlled center height alignment of the tool components and the cutting insert.

It is a further object of the invention to provide a tool assembly having a centerline which is keyed on a dimension of the tool assembly which is not subject to variation in manufacturing operations.

It is still a further object of the invention to provide a locking mechanism for locking a tool holder to a tool block which locates and locks the tool components together in precise centerline alignment with the cutting insert.

SUMMARY OF THE INVENTION

The present invention is directed to a tool assembly comprising a tool holder having a cutting insert assembly at one end thereof and another end adapted to be inserted and secured within a tool block of either a rotating or static machine tool. The tool holder also includes at least one pair of diametrically opposed keyways or slots on the outer surface thereof between the respective ends of the tool holder.

The tool assembly also includes a tool block having an opening for receiving the tool holder. The tool block has on the outer surface thereof at least one pair of diametrically opposed keyways or slots which are alignable with the corresponding slots of the tool holder when the tool components are operatively engaged.

The longitudinal axis of one wall of one of the tool holder slots, referred to herein as the registration slot, is positioned so that the center of the key which is secured therein (i.e., the registration key) corresponds to the centerline of the tool assembly. The cutting insert located at the end of the tool holder is positioned so that the cutting edge of the cutting insert for a given tool assembly always lies in a plane at the same angle with respect to the centerline of the tool assembly, preferably at a right angle to the centerline.

The registration slot of the tool holder and the corresponding slot of the tool block are adapted to receive a standard symmetrical key which has a shape essentially complimentary to the shape of the aligned slots (e.g. rectangular). Such keys are in standard usage for securing tool components together. The registration key is secured within the tool block slot by a screw or other suitable fastening means.

The corresponding slots of the tool holder and tool block which are diametrically opposed to the registration slots are adapted to receive an asymmetrical key referred to herein as a "thrust key" which is an essential part of the present invention. The thrust key has a base and a pair of side surfaces. The top portion of one of the side surfaces extends radially above and over the wall of the tool block slot and is adapted to engage under pressure the wall of the corresponding slot of the tool holder when the tool components are secured together. The thrust key contains spring means which is movable from a first compressed position to a more highly compressed position when the tool components are locked in place. The thrust key is secured to the base of the tool block slot by a screw or similar fastening means.

When the tool holder is operatively secured to the tool block, the pressure exerted against the mating wall of the tool holder slot forces the tool holder to rotate until the wall of the registration slot of the tool holder is firmly pressed against the flat wall of the registration key which has previously been secured in the registration slot.

Excess pressure on the thrust key generated when the tool components are locked together is relieved by the spring means which is provided within the axial hole of the thrust key which also receives the screw to secure the thrust key in the tool block slot. The spring means exerts pressure axially thereby causing the base of the thrust key to rise slightly within the tool block slot to thereby relieve the pressure on the thrust key.

As a result of the present invention, the tool holder and tool block may be locked together in a simple manner by the walls of the tool holder slots. Relative rotational movement between the tool holder and the tool block is prevented because the tool holder is moved by the pressure exerted by the thrust key until the wall of the tool holder registration slot engages under pressure the mating wall of the registration key. In addition, centerline positioning is not affected by the width of the slots because the centerline of the tool components is always aligned with the center of the registration key whose fixed position determines the precise location of the tool holder.

BRIEF DESCRIPTION OF THE DRAWINGS

The following drawings in which like reference characters indicate like parts present illustrative embodiments of the invention and are not intended to limit the scope of the invention as encompassed by the claims forming part of the application.

DETAILED DESCRIPTION OF THE INVENTION

Figures 1, 2:
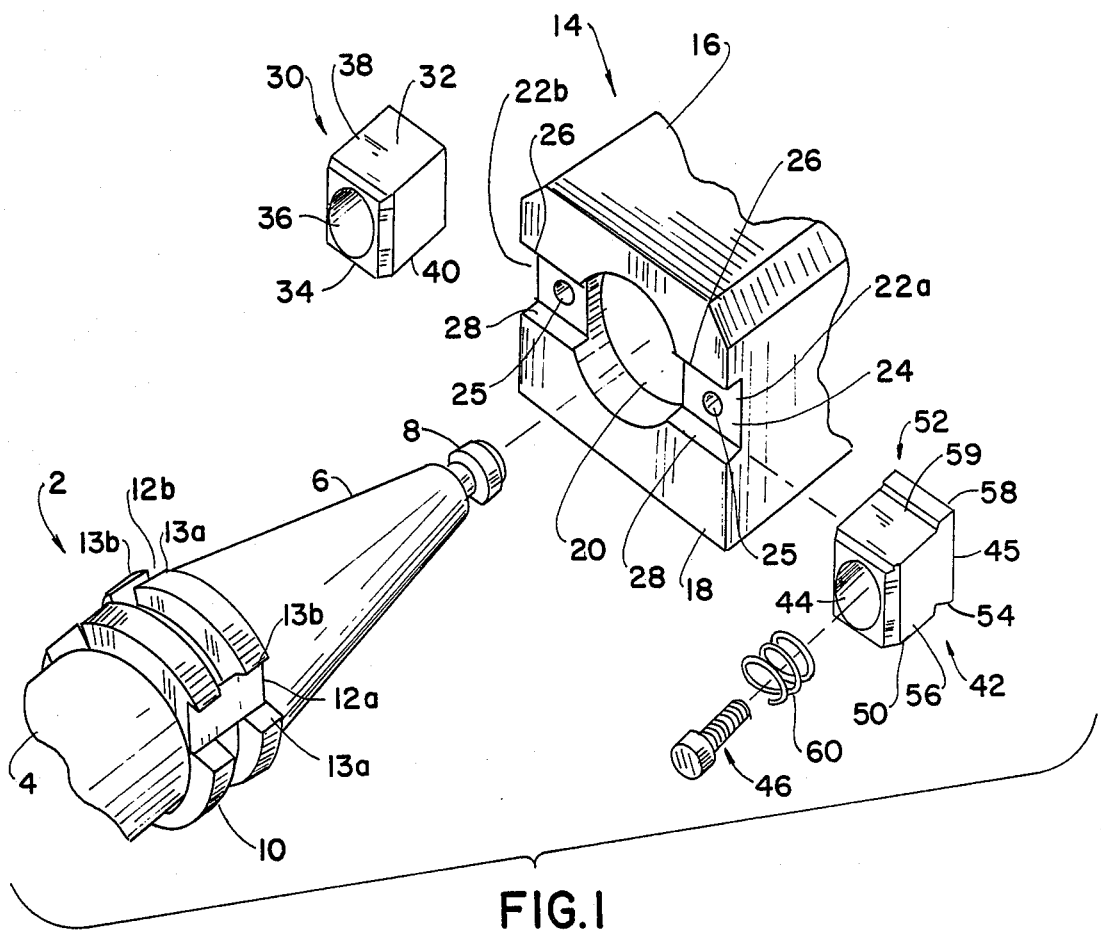
FIG. 1 is a partial perspective view of an embodiment of the invention including a tool holder, a tool block and a locking mechanism used to lock the tool components together.
FIG. 2 is a plan view of the thrust key in the locked position within the tool holder and tool block slots.

Referring to the drawings and particularly to FIG. 1, the tool assembly of the present invention includes a tool holder 2 having a body portion 4 and a tapered shank 6 with a retention knob 8 at the end of the shank 6. Between the shank 6 and the body portion 4 is a collar 10 having a pair of diametrically opposed slots 12a and 12b each having opposed walls 13a and 13b.

The end of the tool holder 2 having the retention knob 8 thereon is insertable into a tool block 14. The tool block 14 includes a body 16, a top surface 18 and a cavity 20 for receiving the tapered shank 6 of the tool holder. Within the cavity 20 is a gripping means (not shown) adapted to engage the retention knob 8 and thereby secure the tool holder 2 within the cavity 20 of the tool block 14. The tool block 14 is secured to a machine tool, particularly to a static machine tool which is adapted to machine moving workpieces in variety ways known to those skilled in the art.

The top surface 18 of the tool block 14 has opposed slots 22a and 22b each of which includes a base 24 having a axial hole 25 therein and a pair of substantially parallel upwardly extending walls 26, 28.

Either one of slots 22a or 22b (22b shown in FIG. 1) is adapted to receive a standard key 30 having a shape complimentary to the slot 22b. Specifically, the standard key 30 is substantially rectangular having opposed walls 32, 34 which desirably engage one or both of the corresponding walls 26, 28 of the slot 22b when the standard key 30 is secured within the slot 22b. The standard key 30 has an axial hole 36 therethrough which is alignable with the axial hole 25 in the base 24 for inserting a screw therein (not shown) to thereby secure the standard key 30 within the slot 22b.

The walls 32, 34 of the standard key 30 extend upwardly above the walls 26, 28 of the slot 22b to expose upper wall sections 38, 40 which are adapted to contact the opposed walls 13a and 13b of the tool holder registration slot 12b, when the tool holder 2 is operatively secured to the tool block 14.

The other of slots 22a or 22b (22a as shown in FIG. 1) has substantially the same shape as slot 22b including base 24, axial hole 25 and upwardly extending walls 26 and 28. Inserted therein is thrust key 42 having an axial hole 44 alignable with the axial hole 25 in the base 24 for securing a screw 46 therein. The thrust key 42, unlike the standard key 30 is asymmetrical and includes a base 45 and opposed sides 50 and 52.

The one side 50 of the thrust key 42 has a lower portion 54 and an upper portion 56. The lower portion 54 has a length at least equal to the height of the wall 28 of the tool block slot 22a so that the upper portion 56 extends into and is adapted to engage the wall 13a of the tool holder slot 12a. In accordance with the invention, the upper portion 56 extends radially above and over the top surface 18 of the tool block 14 so that when the tool holder 2 and the tool block 14 are engaged the upper portion 56 of the thrust key 42 exerts pressure against wall 13a of the tool holder slot 12a causing the tool holder to rotate until wall 13b of registration slot 12b is forced against wall 34 of registration key 30.

The other side 52 of the thrust key 42 has a lower portion 58 which engages by pressure contact the wall 26 of the tool block slot 22a when the tool components are locked together. The pressure exerted on the upper portion 56 of the thrust key 42 against the wall 13a of the slot 12a and the lower portion 58 of the thrust key 42 against the wall 26 of the slot 22a produces a cam effect thereby forcing the tool holder 2 to rotate until the wall 13b of the tool holder registration slot 12b is forced against the registration key 30 to obtain the desired locking condition of the tool components.

Excess pressure arising from the aforementioned cam action is alleviated by a spring 60 which is secured in the axial hole 44 of the thrust key 42 by the screw 46. Movement of the spring from a first compressed position to a second more highly compressed position as a result of the excess pressure exerted on the thrust key 42 causes a portion of the base 45 of the thrust key 42 to rise within the slot 22a to thereby form a gap 62 as shown in FIG. 2.

Figure 3:
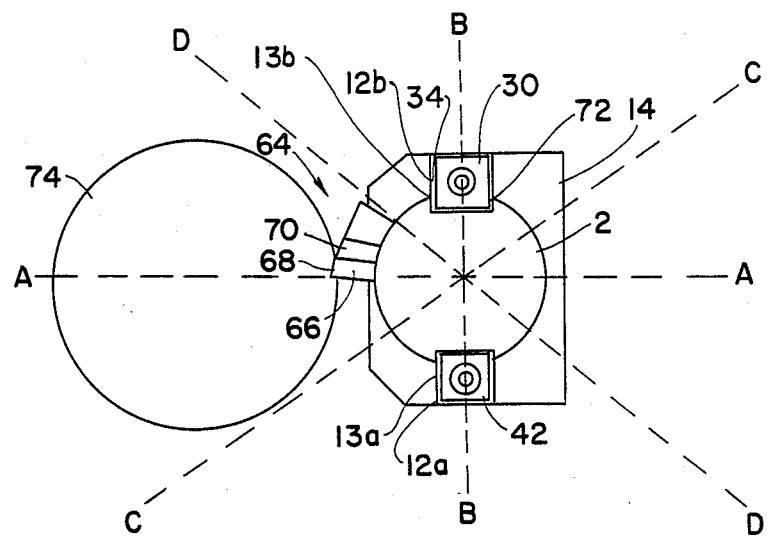
FIG. 3 is a schematic view of the tool assembly of the invention with the plane passing through the cutting edge of the cutting insert perpendicular to the centerline of the tool assembly.

When the tool components are locked together the plane passing through the cutting edge of the cutting insert is in precise angular alignment with the plane passing through the center of the registration key 30 as shown more particularly in FIG. 3.

Referring to FIG. 3, the tool holder 2 has extending from the top surface, a cutting insert assembly 64 including a cutting insert 66 having a cutting edge 68 which nests on a seat 70 in a recess of the tool holder 2 and is secured in the recess in a conventional manner such as by a clamp (not shown).

When the tool holder 2 and the tool block 14 are secured together the thrust key 42 exerts pressure against wall 13a of the tool holder slot 12a causing the tool holder to rotate so that wall 13b of slot 12b is forced against side 34 of the registration key 30 to thereby lock the tool components in place while at the same time insuring that the centerline B—B of the locked tool components is in precise angular alignment with a plane A—A passing through the cutting edge 68 of the cutting insert 66.

As shown in FIG. 3, it is preferred to have the plane B—B of the locked tool components perpendicular to the plane A—A passing through the cutting edge. However, the plane passing through the centerline of the locked tool components may be at an acute angle as shown by line C—C or at an obtuse angle as shown by line D—D and still achieve precise alignment of the tool components with respect to the cutting insert. This is done by positioning the registration slot so that the plane C—C or D—D passes through the center of the registration key.

The present invention therefore overcomes the problems associated with using the center of the registration slot 12b as the centerline of the tool components. In accordance with the present invention, the centerline of the tool components coincides with the centerline of the registration key 30 (i.e. plane B—B) since the novel thrust key 42 of the invention assures that the tool holder 2 will always line up with the registration key 30 because the former is forced against the registration key 30 by the cam action of the thrust key 42. Thus, variations in the width of the registration slot 12b no longer affect centerline alignment. More specifically, as shown in FIG. 3, even if the width of the slot 12b is greater than the width of the registration key 30, as shown by gap 72, the position of the registration key 30 and tool holder 2 are fixed against each other by the face to face contact of wall 13b and wall 34. As a result, machining of the workpiece 74 is precise and relative movement of the tool holder 2 and tool block 14 is prevented.

Figure 4A:
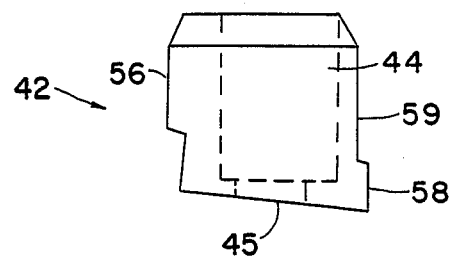
FIG. 4A is a plan view of another embodiment of the thrust key of the invention.
Figure 4B:
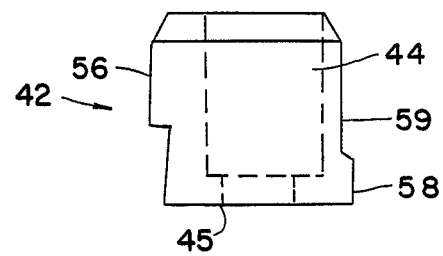
FIG. 4B is a plan view of a further embodiment of the thrust key of the invention.
Figure 4C:
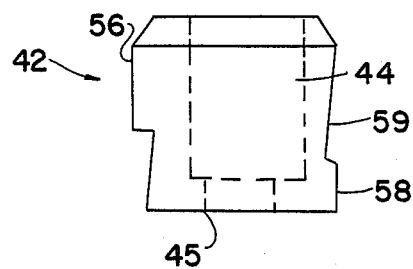
FIG. 4C is a plan view of still another embodiment of the thrust key of the invention.

The thrust key 42 employed in the present invention may have a variety of shapes as shown in FIGS. 4A-4C. For example, the base 45 of the thrust key 42 may be substantially parallel to the base 24 of the slot 22a as shown in FIGS. 4B and 4C or may be angled as shown in FIG. 4A. The upper portion 59 of the side 52 may be parallel to the wall 26 as shown in FIGS. 4A and 4B or may be angled as shown in FIG. 4C.

The thrust key 42 of the present invention must have a lower portion 58 on side 52 which is able to contact wall 26 of slot 22a and on the other side 50 an upper portion 56 which extends above and over the top surface 18 of the tool block 14 to thereby engage under pressure wall 13a of the tool holder slot 12a.

As previously indicated the thrust key system of the prevent invention may be employed in both rotational machine tools and in non-rotation or static machine tools in which the cutting edge remains fixed while the workpiece is moved against the cutting edge. The thrust key system is particularly useful for static tools because it both locates and secures the tool holder to the tool block but also effectively dissipates torque when the cutting insert engages the moving workpiece.

Other embodiments of the invention which would be apparent to those skilled in the art and not specifically shown in the accompanying drawings are within the scope of the invention.

What we claim is:

1. A tool assembly comprising:
   (a) a tool holder comprising a cutting insert assembly at one end, and another end adapted to be inserted into a tool block, and at least one pair of opposed first and second slots on the outer surface of the tool holder between said ends, each of said tool holder slots having at least two wall portions;
   (b) a tool block having one end for receiving said another end of the tool holder and at least one pair of opposed first and second slots alignable with the tool holder slots to form at least one first and second pairs of aligned slots when the tool holder is operatively inserted and secured into the tool block;
   (c) first securing means insertable into at least one of said first pair of aligned slots having a wall for engaging a corresponding wall of the first tool holder slot in which the first securing means is inserted, wherein the centerline of said secured tool holder and tool block extends through the center of said first securing means; and
   (d) second securing means having at least one side surface insertable into at least one of said second pair of aligned slots wherein at least a portion of said side surface engages at least one of said tool holder slot wall portions to exert pressure tangentially against said wall portion of the second tool holder slot in which the second securing means is inserted when the tool holder is operatively secured to the tool block to thereby force the tool holder to rotate until the wall of the first securing means engages the corresponding wall of the first tool holder slot in which the first securing means is inserted.

2. The tool assembly of claim 1 wherein the opposed first and second slots of the tool holder are diametrically opposed from each other and the first and second slots of the tool block are diametrically opposed from each other.

3. The tool assembly of claim 2 wherein each of the tool holder and tool block have one pair of diametrically opposed first and second slots.

4. The tool assembly of claim 1 wherein the first securing means comprises a registration key comprising said wall and means for securing said registration key in a fixed position within said first tool block slot.

5. The tool assembly of claim 1 wherein a plane passing through an operative cutting edge of the cutting insert assembly is substantially perpendicular to the centerline of the secured tool holder and tool block.

6. A tool assembly comprising:
   (a) a tool holder comprising a cutting insert assembly at one end, and another end adapted to be inserted into a tool block, and at least one pair of opposed first and second slots on the outer surface of the tool holder between said ends;

(b) a tool block having one end for receiving said another end of the tool holder and at least one pair of opposed first and second slots alignable with the tool holder slots to form at least one first and second pairs of aligned slots when the tool holder is operatively inserted and secured into the tool block;

(c) first securing means insertable into at least one of said first pair of aligned slots having a wall for engaging a corresponding wall of the first tool holder slot in which the first securing means is inserted, wherein the centerline of said secured tool holder and tool block extends through the center of said first securing means; and (d) second securing means insertable into at least one of said second pair of aligned slots and adapted to exert pressure tangentially against the second tool holder slot in which the second securing means is inserted when the to tool holder is operatively secured to the tool block to thereby force the tool holder to rotate until the wall of the first securing means engages the corresponding wall of the first tool holder slot in which the first securing means is inserted, said second securing means comprising a thrust key having a side wall, an opposed side wall, a spring means and means for securing the thrust key in the second tool block slot, wherein at least a portion of said side wall is adapted to engage a wall of the second tool block slot and wherein a portion of said opposed side wall of the thrust key extends above and radially over the top surface of the second tool block slot to provide a tool holder slot engaging portion.

7. The tool assembly of claim 6 wherein the opposed first and second slots of the tool holder are diametrically opposed from each other and the first and second slots of the tool block are diametrically opposed from each other.

8. The tool assembly of claim 7 wherein each of the tool holder and tool block have one pair of diametrically opposed first and second slots.

9. The tool assembly of claim 6 wherein the first securing means comprises a registration key comprising said wall and means for securing said registration key in a fixed position within said first tool block slot.

10. The tool assembly of claim 6 wherein the thrust key has an axial hole therethrough alignable with a corresponding hole in the second tool block slot, said securing means comprising a screw insertable into said axial and said corresponding hole, said spring means being securing within the axial hole of the thrust key by said screw.

11. The tool assembly of claim 6 wherein said spring means is movable from a first compressed position to a second more highly compressed position when the tool holder is operatively secured to the tool block to thereby relieve excess pressure on the thrust key.

12. The tool assembly of claim 6 wherein a plane passing through an operative cutting edge of the cutting insert assembly is substantially perpendicular to the centerline of the secured tool holder and tool block.

* * * * *